United States Patent
Demel et al.

(10) Patent No.: US 9,346,026 B2
(45) Date of Patent: May 24, 2016

(54) STATIC GAS MIXER

(71) Applicant: UMICORE AG & CO. KG, Hanau-Wolfgang (DE)

(72) Inventors: Yvonne Demel, Altenstadt (DE); Roland Kramarek, Bruchkoebel (DE); Anke Schuler, Woerth (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 509 days.

(21) Appl. No.: 13/863,654

(22) Filed: Apr. 16, 2013

(65) Prior Publication Data

US 2013/0286770 A1   Oct. 31, 2013

(30) Foreign Application Priority Data

Apr. 25, 2012   (DE) .......................... 10 2012 008 108

(51) Int. Cl.
*B01F 5/06*   (2006.01)
*B01F 3/02*   (2006.01)
*F01N 3/20*   (2006.01)

(52) U.S. Cl.
CPC ............... *B01F 5/0608* (2013.01); *B01F 3/02* (2013.01); *B01F 2215/0431* (2013.01); *F01N 3/2066* (2013.01); *F01N 2240/20* (2013.01); *F01N 2610/02* (2013.01)

(58) Field of Classification Search
CPC .................................................... B01F 5/0608
USPC .................................. 366/336, 340; 48/189.4
See application file for complete search history.

(56) References Cited

U.S. PATENT DOCUMENTS

| | | | | |
|---|---|---|---|---|
| 1,312,147 A | * | 8/1919 | Wallwin | B05B 7/0475 239/427 |
| 2,125,245 A | * | 7/1938 | McCray | B01F 5/0682 138/42 |
| 2,965,695 A | * | 12/1960 | Sleicher | B01F 5/0682 138/40 |
| 3,092,206 A | * | 6/1963 | Moreau | F01N 1/083 181/270 |
| 3,361,412 A | * | 1/1968 | Cole | B29B 7/325 138/42 |
| 3,526,391 A | * | 9/1970 | Church | B01F 5/0604 366/340 |
| 4,869,849 A | * | 9/1989 | Hirose | B01F 5/0682 261/78.2 |
| 6,159,429 A | | 12/2000 | Bemel | |

(Continued)

FOREIGN PATENT DOCUMENTS

DE   8114822 U1   10/1981
DE   8617669 U1   10/1987

(Continued)

OTHER PUBLICATIONS

"Computational Fluid Dynamics" German Wikipedia article described on p. 10 of the application (https://de.wikipedia.org/wiki/Numerische_Str%C3%B6mungsmechanik), the enclosed version pulled from the internet on Nov. 8, 2013.

(Continued)

*Primary Examiner* — David Sorkin
(74) *Attorney, Agent, or Firm* — Smith, Gambrell & Russell, LLP

(57) ABSTRACT

The present invention is directed to an apparatus for mixing gaseous mixture components. The present invention likewise relates to a correspondingly applied method and to the use of an apparatus according to the invention for mixing components of the exhaust gas of internal combustion engines with a reducing agent and to a correspondingly designed reactor.

20 Claims, 3 Drawing Sheets

(56) References Cited

U.S. PATENT DOCUMENTS

| | | |
|---|---|---|
| 2003/0053944 A1 | 3/2003 | Mori et al. |
| 2011/0271658 A1 | 11/2011 | Hoyer et al. |
| 2011/0277450 A1 | 11/2011 | Hoyer et al. |
| 2012/0321537 A1 | 12/2012 | Mergner et al. |
| 2013/0065973 A1 | 3/2013 | Hirschberg et al. |

FOREIGN PATENT DOCUMENTS

| | | |
|---|---|---|
| DE | 10 2011 012 799 A1 | 3/2012 |
| EP | 1 029 588 A1 | 8/2000 |
| EP | 2 292 321 A1 | 3/2011 |
| EP | 2 518 099 A1 | 10/2012 |
| GB | 411655 | 6/1934 |
| GB | 413967 | 7/1934 |
| JP | 2011098324 | 5/2011 |
| JP | 2011121038 | 6/2011 |
| WO | 2007/099288 | 9/2007 |
| WO | 2010/034452 A1 | 4/2010 |
| WO | 2010/097146 A1 | 9/2010 |
| WO | 2011/098450 A1 | 8/2011 |
| WO | 2011/116840 A1 | 9/2011 |
| WO | 2011/134059 A1 | 11/2011 |
| WO | 2012/034922 A1 | 3/2012 |
| WO | 2012/165000 A1 | 12/2012 |

OTHER PUBLICATIONS

"Computational Fluid Dynamics" English Wikipedia article (http://en.wikipedia.org/wiki/Computational_fluid_dynamics), the enclosed version pulled from the internet on Nov. 8, 2013.

* cited by examiner

Di = 20.9 mm
Da = 24.0 mm
L = 56.0 mm
L_(1st level-2nd level) = 29.5 mm

Second level:
D = 5.0 mm

First level:
D = 8.2 mm

STATIC GAS MIXER

The present invention is directed to an apparatus for mixing gaseous mixture components. The present invention likewise relates to a correspondingly applied method and to the use of an apparatus according to the invention for mixing components of the exhaust gas of internal combustion engines with a reducing agent and to a correspondingly designed reactor.

The mixing of certain components in gas flows is a chemical engineering process with a long history. In mixing processes, the constituents of at least two separately present starting substances are repositioned by relative movement such that a new arrangement pattern is generated. Here, a mixture (mix) is generated, and under certain conditions a new substance is generated. It is a primary aim to attain a demanded homogeneity of the new substance. From economical and chemical engineering aspects, the mixing time and the energy expended for the mixing process play an important role. In the case of substances which do not spontaneously mix homogeneously, it is important for the mixer to impart the greatest possible relative movement to the material to be mixed. It is ideally the case here that the intensity and direction of the introduction of force change constantly.

A mixing process is distinguished inter alia with regard to the states of aggregation of the components to be mixed or for example with regard to the manner of the mixing. In the case of the latter classification, a distinction can be made between dynamic and static mixing. In the case of so-called static mixing, the introduction of energy required for achieving the mixing is imparted exclusively by the kinetic energy of the components to be mixed. Usually, in the case of such methods, the substance flows are opposed by certain mechanical resistances which cause as turbulent as possible a swirling of the components to be mixed, and thus lead to homogeneous mixing.

For the mixing of substance flows, numerous mixers based on the abovementioned static principle have already been proposed in the prior art (G8114822, G8617669, WO2011134059, WO2011116840, EP1029588, EP2292321). In JP20110121038, it is proposed that the component flow to be mixed be opposed by two or more baffle plates, wherein holes are situated in the baffle plates and the holes of adjacent baffle plates are arranged offset with respect to one another. By contrast, JP20110098324 is based on a different geometry of the holes in the baffle plates of a static mixer. Here, a central hole in one baffle plate is followed by two holes arranged eccentrically and offset by an angle of 180°. This unit is repeated in order to be able to ensure correspondingly good mixing.

A problem addressed by the present invention was that of specifying a static mixer which is improved in relation to the prior art and which provides improved results for the intermixing of gaseous components. In particular, the static mixer according to the invention should be capable of ensuring optimum intermixing of the components over as short a distance as possible. It must be ensured here that the pressure increase across the mixer should be as small as possible.

These and further problems which emerge in an obvious manner to a person skilled in the art from the prior art are solved by means of a static mixer having the features of the present claim 1. Advantageous embodiments of the present invention are protected by subclaims 2 to 8, which are dependent on claim 1. Claim 9 relates to a method according to the invention, and claim 10 is directed to a preferred use of the mixer according to the invention. Claim 11 encompasses a reactor which has the mixer according to the invention.

By using a static mixer for mixing components in gas flows, said static mixer having a housing (5) in which are situated at least two baffle plates (2) which are arranged one behind the other in the flow direction of the mixture components and which have in each case at least two eccentrically arranged holes (4), wherein the holes (4) of the preceding baffle plate (2) and the holes (4) of the respectively following baffle plate (2) are arranged offset with respect to one another by an angle about the central longitudinal axis, such that the holes of the preceding baffle plate are situated on one half of said baffle plate, whereas the holes of the following baffle plate are situated on the other half of said baffle plate, one arrives in a very surprising but no less advantageous manner at the solution to the stated problem. As a result of the geometry, selected here, of the opposing holes (2) in the baffle plates, it is obviously the case that good turbulences, and thus optimum intermixing of the components in the incoming gas flows, are achieved such that the mixer can be of correspondingly small size. It must additionally be noted that the counterpressure to which the incoming gas flow is subjected by the mixer according to the invention is pleasingly low. This is particularly advantageous against the economic background of the application envisaged here.

The housing (5) of the mixer according to the invention may be formed so as to take on shapes known to a person skilled in the art. The shaping of the outer housing (5) is coordinated predominantly with the geometry of the surrounding reactor in which the static mixer is situated. Aside from a rectangular or square design (as viewed in the longitudinal direction), a circular basic shape is expedient in particular for tubular reactors. Accordingly, the housing (5) is advantageously composed of a cylindrical wall which can be easily inserted into and anchored in the surrounding tubular reactor.

As already indicated further above, the static mixer according to the invention has at least two baffle plates (2) with at least two holes (4) situated eccentrically on opposite halves. Depending on the geometry and embodiment of the static mixer, it is also possible for multiple such baffle plates to be situated in the mixer housing. It is necessary here to evaluate by what factor the mixing can be improved by the insertion of further baffle plates, with regard to the fact that the mixing should take place over as short a distance as possible, little counterpressure should be generated and the most uncomplicated and expedient mixer possible should be used. An optimum balance between said factors for the envisaged application must be found. The number of baffle plates which oppose the exhaust-gas flow preferably amounts to 3-5 units. It is very particularly preferable for only three baffle plates (2) to be used. For clarification, it is pointed out that the baffle plates (2) referred to here do not include those arranged at the inlet side and at the outlet side.

The static mixer according to the invention is composed, as specified above, of at least two correspondingly designed baffle plates (2). In addition to said baffle plates, it has proven to be advantageous for baffle plates (1, 1') to likewise be provided at the inlet side and/or at the outlet side of the mixer, the latter baffle plates being capable of imparting a certain flow direction to the exhaust-gas flow. Said baffle plates (1, 1') referred to here preferably likewise have a concentrically situated hole (3; 3') through which the gas flow is conducted. It is pointed out that said one hole may also be formed by a plurality of small holes which may be distributed about the center of the baffle plate. It is important—as is the case for the dimensioning of all of the holes of the baffle plates (see further below)—that an adequate compromise between turbulent flow and counterpressure can be found. A further advantage of the baffle plates at the inlet and outlet sides is that they impart a particular degree of stability to the mixer. This is advantageous in particular for applications in which the mixer is produced from brittle materials such as glass, in particular quartz glass.

The at least two baffle plates (2) situated in the static mixer according to the invention are characterized in that they have at least two eccentrically arranged holes (4). The gas flows in a turbulent manner through said holes, the dimensions of which will be defined further below, and said gas is thus intermixed and subsequently passes to the next baffle plate. Within the scope of the invention, it is left to the discretion of a person skilled in the art as to how many holes (4) he wishes to arrange on one half of the baffle plate (2). Here, too, he will again aim to achieve the greatest possible amount of turbulence, and thus good intermixing of the gas components, over as short a distance as possible and with the smallest possible counterpressure. It is particularly preferable for the number of holes per baffle plate to be two to five. It is particularly preferable for two to three holes to be arranged eccentrically on one half of the baffle plate. Very particularly preferable in this context is the corresponding arrangement of two holes.

The holes situated in the mixer on the baffle plates thereof are, with the exception of the baffle plates (1, 1') optionally situated on the inlet side and on the outlet side, concentrated on one half of the baffle plate (2). This has the purpose of preventing the gas flow from passing through the mixer in a direct line. The gas flow should rather be conducted through the mixer to the greatest possible extent on a circuitous route, such that the turbulence in the gas flow increases. The arrangement of the holes (4) on one half of the baffle plate (2) is thus implemented by a person skilled in the art such that, according to the invention, the best possible intermixing of the gas flow can be attained. It has now proven to be very particularly advantageous for the holes (4) in one and the following baffle plate (2) to be arranged offset with respect to one another by an angle of 180° about the longitudinal axis. This advantageously means that, in a plan view of the mixer, the holes on one half in one baffle plate (2) are exactly mirror-symmetrical with respect to the holes in the subsequent baffle plate (2), which are situated on the other half. With regard to the exact dimensioning of the holes and the relative positioning thereof with respect to one another and with respect to the housing, reference is made to the embodiment below.

The baffle plates (2) situated in the mixer and those optionally mounted (1, 1') on the inlet side and outlet side of the mixer may be mounted in any desired manner with regard to their relative position with respect to one another by a person skilled in the art. What is preferable, inter alia, is an arrangement in which the baffle plates are not in a symmetrical arrangement, or are at most in a helically symmetrical arrangement, relative to one another. Also preferable is an arrangement in which two imaginary surfaces formed by two adjacent baffle plates intersect so as to yield a right angle between the surface edge and the line of intersection of the surfaces. Here, the angle between the intersecting surfaces may be set as desired by a person skilled in the art, but should not amount to over 90°, preferably should not amount to over 75° and very particularly preferably should not amount to over 60°. In an extremely preferred embodiment, however, the baffle plates are parallel to one another. If the baffle plates are in such an arrangement, it is left to the discretion of a person skilled in the art as to how he wishes to position the baffle plates in relation to the gas flow directed in the longitudinal direction of the static mixer. It is particularly preferable here for the baffle plates to be arranged at right angles to the longitudinal axis of the housing of the mixer.

The present invention likewise relates to a method for mixing mixture components in gas flows. The method is characterized in that a static mixer as proposed above is used for mixing the gas components. Here, the method according to the invention assumes that a mixer as described above is placed into a reactor through which a gas flow, which has different gaseous components, is conducted. Said gas flow impinges at the inlet side if appropriate against the optionally provided first baffle plate (1), in which one or more centrally arranged holes (3) are provided. The gas flow is then conducted through said first baffle plate (1) and through the holes situated therein and is consequently swirled. The gas flow then impinges against a further baffle plate (2) in which the holes (4) for conducting the gas flow through are situated eccentrically on one half of said baffle plate (2). Swirling of the gas flow is again effected. The next baffle plate (2) is now arranged according to the invention such that its holes (4) are arranged on the opposite half in relation to the preceding baffle plate (2). This obviously results in an extreme formation of turbulence as the gas flows through correspondingly designed baffle plates (2). In any case, after the gas passes through said two baffle plates (2), extremely good mixing of the components situated in the gas is observed at the outflow side of said latter baffle plate. These may optionally be followed by a further baffle plate (2) with holes (4) situated in turn on the opposite half, which contributes yet further to improved intermixing of the gas flow. Finally, it is possible, if appropriate, for a baffle plate (1') similar to that situated at the inlet side to be arranged on the outlet side, the latter baffle plate imparts an even greater degree of homogeneity both with regard to intermixing and also with regard to flow direction to the already extremely well-intermixed gas flow. It has been found that said method for the intermixing of a gas flow is particularly well suited to attaining optimum mixing of the components situated in the gas flow over a very short distance and with the least possible counterpressure. It was not possible to derive this from the prior art.

In one particularly preferred embodiment, the present mixer element in the form of a static mixer is used for the intermixing of exhaust-gas components, such as exist in the exhaust gas of an internal combustion engine, with a reducing agent. The mixer according to the invention can advantageously be used for the intermixing of a reducing agent, for example ammonia, with the nitrogen-oxide-containing exhaust gas of a lean-combustion gasoline or diesel engine. The good mixing of said gas components is important in particular with regard to the subsequent reduction of the nitrogen oxides with the reducing agent on a so-called SCR catalytic converter (DE102011012799, WO12034922, WO11098450, WO10097146, WO10034452 and the literature cited therein) arranged on the outflow side of the mixer. Only if the components impinge in well-mixed form on said catalytic converter can an optimum stoichiometric reduction of the nitrogen oxides with the reducing agent, which is formed preferably from ammonia, take place. The mixer according to the invention has proven itself in particular for use in model gas systems in which corresponding prototypes of SCR catalytic converters are tested.

Accordingly, a further final subject matter of the present invention is formed by a correspondingly designed reactor which has a static mixer according to the invention. Here, the reactor is preferably set up such that, upstream of the mixer, the individual gas components are dosed into the reactor from below and/or from the side. The gas components are subsequently conducted via the mixer according to the invention, in which the mixing of the gas components is performed. The conversion of the intermixed gas subsequently takes place on the SCR catalytic converter which is used.

The reactor described here may be configured in a variety of ways. As a constituent part of a model gas system, the reactor and also the mixer according to the invention may be composed for example of glass, preferably quartz glass. Said reactor is furthermore preferably of cylindrical form and has a dosing device, situated laterally and upstream of the mixer, for ammonia. The model exhaust gas flows into the reactor, is enriched with ammonia and is mixed by means of the mixer before impinging against the catalytic converter and being reduced there. It is pointed out that a mixer as described here may also be used, in correspondingly adapted form, as a constituent part of a real exhaust system (reactor) with SCR catalytic converter in an automobile.

The statements made here are intended for gas speeds that are normally encountered in exhaust tracts of lean-combustion diesel or gasoline engines. Here, the volume flow rates lie in the range of 0.5-10 m$^3$/h, preferably 0.5-6 m$^3$/h and particularly preferably 1-4 m$^3$/h. The mixer described here is however also suitable for use in industrial applications. A person skilled in the art knows how he can adapt the dimensioning of the mixer according to the invention to the conditions applicable here in order to be able to attain correspondingly good mixing performance. The exceptionally good intermixing in gas flows resulting from the relative position of the holes in the baffle plates of the mixer according to the invention has thus been achieved in a surprisingly simple manner. A corresponding arrangement is not suggested in any way by the known prior art.

NUMBERING

1, 1': Baffle plate on the inlet side and outlet side respectively
2: Baffle plate with the at least two holes
3, 3': Holes of the baffle plate on the inlet side and outlet side respectively
4: Holes of the baffle plate with at least two holes
5: Wall/housing of the mixer FIG. 1 shows, by way of example, a reactor according to the invention in a side view. It is possible to see the baffle plates (1, 1', 2) with the holes (2, 3, 3') thereof. Here, the holes (2) are configured according to the invention so as to be situated on the respectively opposite half in relation to the preceding baffle plate. The optional baffle plates on the inlet and outlet sides (1, 1') have holes (3, 3') arranged centrally.

RELATIVE DIMENSIONING

Figure 1:
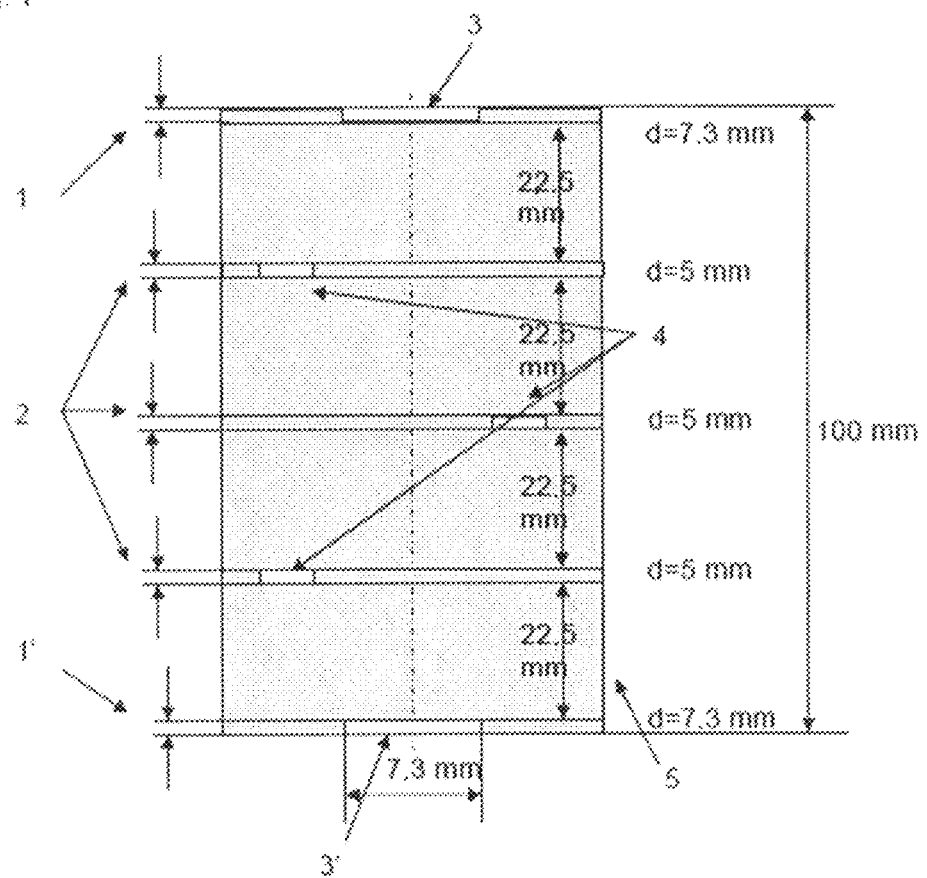
Figure 2:
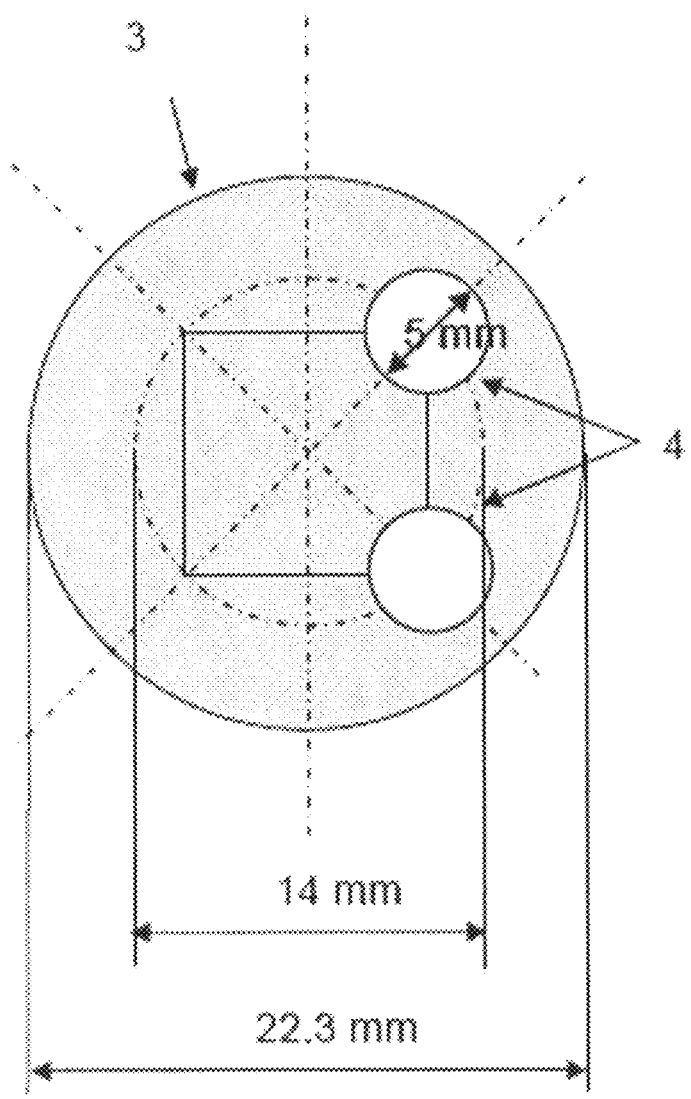
FIG. 2 shows a baffle plate 2 in plan view. It is possible to see two holes (4) on one half of the baffle plate.
Figure 3:
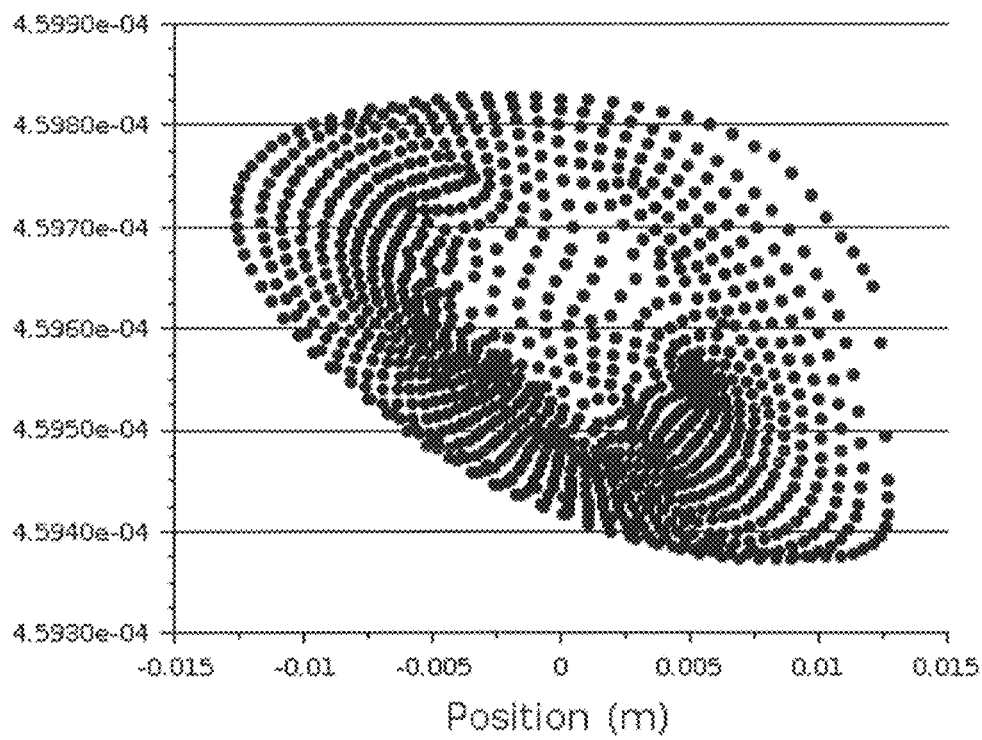
FIG. 3 shows the result of a calculation regarding the mixing of the gas component NH$_3$ in a model exhaust-gas flow for lean-burn internal combustion engines by means of the mixer from FIG. 1 (see further below).

With regard to the dimensioning of the individual constituent parts of the mixer, reference is made to FIGS. 1 and 2 which are mentioned by way of example. Here, the dimensions of the baffle plates and of the holes are illustrated by way of example on the basis of a mixer 10 cm in height and approximately 2.25 cm in diameter. It is pointed out that the following values may vary relative to the selected diameter of the mixer.

The dimensioning and form of the holes (3, 3') (circular, oval, polygonal) is advantageously between 6 and 8.5 mm, preferably between 6.5 and 8 mm and is particularly preferably approximately 7.3 mm. The holes (4) may, on each baffle plate, be of the same size or different sizes and vary with regard to their form (circular, oval, polygonal). Said holes are generally between 3 and 7 mm, preferably between 4 and 6 mm, and are very preferably approximately 5 mm, in diameter.

The thickness of the individual baffle plates may be selected as desired by a person skilled in the art. The material and the strength thereof must certainly be incorporated in the considerations of a person skilled in the art. The thickness of the baffle plates (1, 1') is advantageously 1-4 mm, preferably 1.5-3 mm and very preferably approximately 2 mm. The baffle plates (2) may be of the same dimensions or else may have a thickness, which differs from that of the baffle plates (1, 1'), of 1-4 mm, preferably 1.5-3 mm and very preferably approximately 2 mm. It is also the case here that the stated values apply to the mixer illustrated by way of example in FIG. 1. In the event of a change in the height or of the diameter, a person skilled in the art must correspondingly adapt said values.

EXAMPLES

The homogeneity of the mixing of the gas flows upstream of the inlet into the catalytic converter was calculated by means of CFD (Computational Fluid Dynamics) (Industrial e-News Bulletin, Air Pollution Control Systems, Blender Products, 800-523-5705; http://de.wikipedia.org/wiki/Numerische_Str%C3%B6mungsmechanik). The influence of the mixture on the flow field and concentration distribution of the gases were determined mathematically. For this purpose, the predefined geometry data of the mixer were transferred into a mathematical model, and three-dimensional CFD calculations were carried out with a set of boundary conditions (mass flows rates, temperature):

|  | Total mass flow rate Nl/h | Gas temperature [° C.] | NH3 gas flow rate Nl/h |
|---|---|---|---|
| at 1 | 1158 | 300 | 5.2 |
| at 2 | 2316 | 300 | 10.4 |

Gas mixture composition is:

450 ppm NH$_3$ via the side stream (NH$_3$ into N$_2$ with 10%)

500 ppm NO

5% O$_2$

5% H$_2$O

Remainder N$_2$

1. Calculated NH$_3$ mole fraction at the inlet into the catalytic converter—distribution for volume flow rate 1158 l/h

Figure 4:
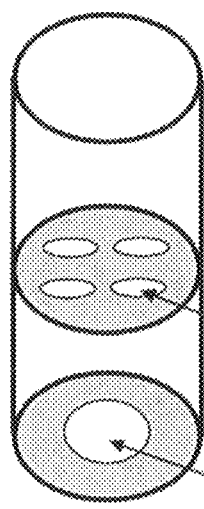
FIG. 4 shows a mixer geometry not according to the invention.

| Mixer | NH$_3$ distribution over the y axis [ppm] |
|---|---|
| Mixer not according to the invention (FIG. 4) | Between 425 + 485 ppm |
| 5 disk bores 1 + 2 + 2 + 2 + 1 (Offset 180°) (FIG. 1) | Between 459.3 + 459.9 ppm |

2. Calculated NH$_3$ mole fraction at the inlet into the catalytic converter—distribution for volume flow rate 2316 l/h

| Mixer | NH$_3$ distribution over the y axis [ppm] |
|---|---|
| 4 disk bores 1 + 4 + 1 + 4 (Offset 45°) | Between 458 + 461 ppm |
| 5 disk bores 1 + 2 + 2 + 2 + 1 (Offset 180°) (FIG. 1) | Between 459.4 + 459.8 ppm |

The invention claimed is:

1. An exhaust system for treating an exhaust gas, comprising
a static mixer for mixing components in a gas flow, and a catalytic converter for subjecting the gas flow to a catalytic reaction, wherein
the static mixer comprises:
a housing in which there is situated at least two baffle plates arranged one behind the other in a gas flow direction, both baffle plates having at least two eccentrically arranged holes,
wherein the holes of the upstream baffle plate and the holes of the downstream baffle plate are offset from one another,
wherein the holes of the upstream baffle plate are situated on one half of the upstream baffle plate, whereas the holes of the downstream baffle plate are situated on one half of the downstream baffle plate, with the one half of the downstream baffle plate having the holes situated thereon being an opposite half from the one half of the upstream baffle plate having the holes situated thereon, and
the static mixer is positioned upstream of the catalytic converter in a flow path for the gas flow through the exhaust system.

2. The exhaust system of claim 1, wherein the housing of the static mixer is of cylindrical design.

3. The exhaust system of claim 1, wherein an inlet and an outlet of the static mixer both comprise an end baffle plate, both end baffle plates having a hole situated thereon, the holes of the two end baffle plates being concentric with one another.

4. The exhaust system of claim 1, wherein the static mixer comprises three baffle plates arranged one behind the other.

5. The exhaust system of claim 1, wherein the static mixer comprises a baffle plate having at least two holes that are arranged eccentrically relative to a central point of the baffle plate.

6. The exhaust system of claim 1, wherein the holes in an upstream baffle plate and a subsequent downstream baffle plate of the static mixer are arranged offset with respect to one another by an angle of 180° about the longitudinal axis.

7. The exhaust system of claim 1, wherein the baffle plates of the static mixer are arranged parallel to one another.

8. The exhaust system of claim 1, wherein the baffle plates of the static mixer are arranged at right angles to the longitudinal axis of the housing of the static mixer.

9. A method for mixing mixture components in gas flows, wherein one mixture component is introduced with the other into an exhaust system as claimed in claim 1.

10. A method of mixing gas components which exist in the exhaust gas of an internal combustion engine and a reducing agent by subjecting said gas components and reducing agent to an exhaust system as claimed in claim 1.

11. The exhaust system of claim 1, wherein the catalytic converter and the static mixer are both contained within a catalytic reactor, the static mixer being positioned upstream of the catalytic converter in the catalytic reactor.

12. The exhaust system of claim 1, wherein the holes of the upstream baffle plate and the holes of downstream baffle plate of the static mixer are offset from one another by an angle about a longitudinal axis that passes through at least one of the upstream baffle and the downstream baffle.

13. The exhaust system of claim 12, wherein the longitudinal axis that passes through at least one of the upstream baffle and the downstream baffle is a central longitudinal axis of the housing.

14. The exhaust system of claim 2, wherein the holes of the upstream baffle plate and the holes of downstream baffle plate of the static mixer are offset from one another by an angle about a central longitudinal axis of the housing.

15. The exhaust system of claim 1, wherein the static mixer is configured to receive, at an inlet end, a gas flow comprising at least two gas flow components at a first degree of homogeneity; subject the at least two gas flow components to a static mixing; and output, at an outlet end, a gas flow comprising the at least two gas flow components at a second degree of homogeneity, wherein the second degree of homogeneity is greater than the first degree of homogeneity.

16. The exhaust system of claim 1, wherein the exhaust system is positioned downstream of an internal combustion engine for receiving and treating the exhausts gases of the internal combustion engine.

17. The exhaust system of claim 1, wherein the exhaust system is positioned in an automobile.

18. The exhaust system of claim 1, wherein the exhaust system is a model gas system for receiving and treating a model exhaust gas.

19. A method of assembling the exhaust system of claim 1, comprising positioning the static mixer in an exhaust gas passageway that comprises the catalytic converter, with the static mixer positioned at a location in the exhaust gas passageway that is upstream of the catalytic converter.

20. A method of assembling the exhaust system of claim 1, comprising
positioning a catalytic reactor in an exhaust gas passageway, the catalytic reactor comprising the catalytic converter and the static mixer,
wherein positioning of the catalytic reactor in the exhaust gas passageway comprises orienting the catalytic reactor such that the static mixer is positioned upstream of the catalytic converter, relative to an exhaust gas flow direction.

* * * * *